United States Patent [19]

Schwab et al.

[11] 4,231,655
[45] Nov. 4, 1980

[54] METHOD OF DYNAMIC REPRESENTATION AND APPARATUS THEREFOR

[75] Inventors: Klaus M. Schwab, Troinex, Switzerland; Detlev Kahrbek, Blumenau, Brazil

[73] Assignee: International Educational Services AG, Chur, Switzerland

[21] Appl. No.: 15,669

[22] Filed: Feb. 27, 1979

[30] Foreign Application Priority Data

Oct. 31, 1978 [CH] Switzerland ............... 11205/78

[51] Int. Cl.³ ............................................. G03B 27/52
[52] U.S. Cl. ................................. 355/40; 354/292; 355/75; 355/77
[58] Field of Search ................ 354/80, 290–292; 35/28; 40/411; 355/77, 75, 76, 40, 23, 79

[56] References Cited

U.S. PATENT DOCUMENTS

| | | | |
|---|---|---|---|
| 3,014,302 | 12/1961 | Hughes | 354/292 X |
| 3,186,323 | 6/1965 | Niehaus | 354/292 |
| 3,675,999 | 7/1972 | Komori et al. | 355/23 X |

Primary Examiner—Richard A. Wintercorn
Attorney, Agent, or Firm—Robert E. Burns; Emmanuel J. Lobato; Bruce L. Adams

[57] ABSTRACT

A method of dynamic representation using a support, a removable reference sheet secured to the support and bearing at least two inscribed parameters or variables, movable members for mounting on the sheet by detachable magnetic attachment with the support, and a photo-copying apparatus. The members can be mounted on the sheet in a succession of different positions according to pairs of variables. The support is turned upside down after each positioning of the members and photocopied in order to obtain a succession of instantaneous representations of parts of a dynamic process.

8 Claims, 2 Drawing Figures

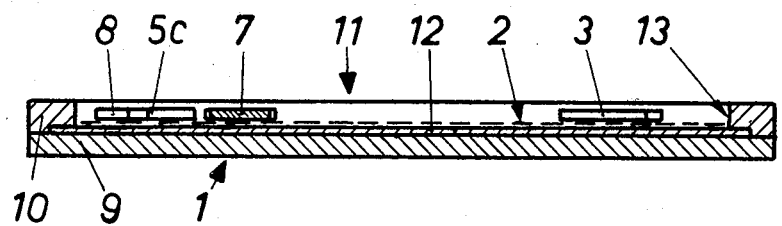
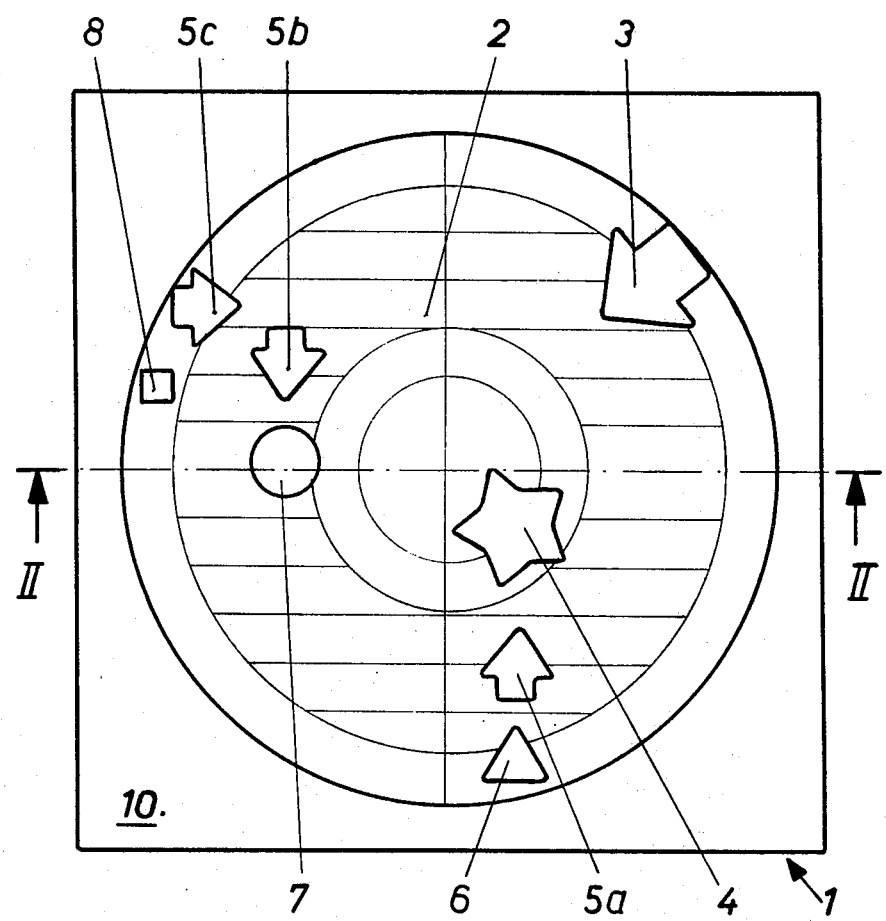

METHOD OF DYNAMIC REPRESENTATION AND APPARATUS THEREFOR

FIELD OF THE INVENTION

This invention relates to a method of dynamic representation.

The invention also relates to an apparatus for use in carrying out the method.

BACKGROUND OF THE INVENTION

It is known to what points teaching methods and methods for stimulating thinking have developed during the last ten or twenty years, both in universities and schools of all types as well as in the world of business affairs and industrial production.

Amongst the teaching means most widely used in the framework of the new didactic approach to teaching, it is possible to mention the method of case studies, the simulation of situations and the discussion of examples.

Whereas a first trend of these relatively recent developments has seen the role entrusted to the computer and the influence of the latter on its master increasing incessantly, on the contrary, a second trend has led towards the simplification of the methods and means used within the framework of pedagogic action.

At this point, it is useful to point out the decisive role played by photo-copying machines in the process for the diffusion of information, compared with that of computers.

Numerous methods have been proposed for facilitating the organisation of work, the classification of data for problems, the analysis of variables and the formulation of synthesis elements. Firstly, it is probably in the field of accountancy that the greatest imagination has been shown, then in the planning of production, the study of strategies etc.

Whether it is in the academic field, in that of the university, for continuous professional teaching or, more simply, in the daily work of the worker, taken separately or in a working group, the action of setting a problem correctly, or establishing the adequate diagnosis of a situation and that of examining the interaction of the variables, respectively making a list of the possible choices and their advantages and disadvantages, upon consideration, all too frequently gives rise to fantastic or inefficient steps.

From the point of view of the means available, study classes such as working groups or the individual left to himself may use either a pencil and paper, or even the combination of a pencil and printed guide, or visual and audiovisual means such as television combined with the computer, projection on a screen, or other uses of elaborate technical means. A dynamic process for grasping the development of a situation, respectively the incidence of variables on the development of a process at present exists as a graphic projection solely in combination with the above-mentioned elaborate and expensive means.

For its part, photo-copying has been introduced almost everywhere and has become very accessible due to the favourable development which has occurred in the relationship of the unit cost of a copy to the cost of the man hours saved. However, photo-copying as a pedagogic tool or didactic auxiliary, has hitherto not been used other than as means for the duplication, if necessary fixing of an original document.

Finally, auxiliary graphic means (tables, diagrams, models and their occasional moving accessories such as pegs, cut-outs etc.) have hitherto not benefitted from the resources of photo-copying in view of the general absence of compatibility between the mobility of some and imperatives of the other.

SUMMARY OF INVENTION

An object of the invention is to obviate or at least mitigate these drawbacks.

According to the invention there is provided a method of dynamic representation using at least one support, one reference sheet comprising at least two parameters or variables, one moving member, means for securing this reference sheet and means for the detachable connection of this member, to this support, and a photo-copying apparatus, said method comprising mounting said reference sheet on said support, positioning said member a first time on said reference sheet according to a first pair of parameters, placing said support arranged in this way upside down on a window of said photo-copying apparatus in order to make a copy of the support thus arranged, turning said support over, positioning said member a second time on said reference sheet according to a second pair of parameters, copying this new position as previously and repeating the sequence of positioning the member and copying its position as many times as necessary in order to obtain a succession of instantaneous representations of parts of a dynamic process, in the form of photo-copies.

An apparatus for use in carrying out the method comprises at least one support, at least one reference sheet, at least one removable member, means for securing the sheet, means for the detachable connection of the member to the support; said support comprising an interconnected base and rim forming at least one window on the base above which said reference sheet is placed, and the height of said rim, with respect to the upper surface of said reference sheet appearing in the window, being greater than the depth of said removable member.

The means for the detachable connection of the member can comprise at least one thin metal plate fixed to the base in the area exposed by said window, and magetized material forming at least part of the member.

BRIEF DESCRIPTION OF DRAWINGS

The invention will now be further described, by way of example, with reference to the accompanying drawings in which:

FIG. 1 is a plan view of apparatus with a diagrammatic arrangement of its parts for use in carrying out the method according to the invention, and FIG. 2 is a cross-sectionaly view on line II—II of FIG. 1.

DESCRIPTION OF PREFERRED EMBODIMENT

Referring to the drawings, one can distinguish: a support 1, a reference sheet 2 and removable members 3,4,5a,5b, 6,7 and 8.

The support 1 is constituted by a base 9 and rim 10 interconnected by adhesion. In the upper central part of the support 1, this rim forms a window 11 which on this occasion is circular, whereas the chosen support is square.

Located on the base 9, gripped between the latter and the rim 10 is a thin metal plate 12, to which the reference sheet 2 is secured by adhesion, or by being gripped against the wall 13 of the rim 10.

The reference numerals 3,4,5a,5b,6,7 and 8 indicate movable members constituted by cutting out a sufficiently magnetic material whose upper surface may be coloured in order to distinguish various functions or attributes. The magnetic attraction created between the plate 12 and these members keeps them in position whilst enabling them to be moved, respectively removed from the support, when a sufficient force is applied thereto.

The height of the rim 10 with respect to the surface of the reference sheet 2 is greater than the constant depth of the removable members 3,4,5a,5b,5c,6,7 and 8. The purpose of this technical measure will now become apparent in relation to the description of the method.

As an example, let us imagine that the reference sheet 2 is a printed sheet having a certain number of compartments identified by letters, numbers or words and each characterising an aspect, a sector, a function or objective of a commercial or industrial enterprise. The members 3,4,5 or 6, 7 and 8 represent indications of situation, value, trend etc. For example, to begin with one will have a definite situation: these members are positioned to indicate with respect to a given aspect, sector, function or objective, the situation, value, trend etc. at the present. When the members are arranged in this way on the suitable reference sheet, the support is turned upside down and said members remain in place owing to the magnetic attraction connecting them to the plate. This arrangement may thus be placed upside down on the window of a photo-copying apparatus and a photocopy can be made.

It is now possible to see that, since the magnetic force enables the members to remain in place when the support is turned upside down for photo-copying, the difference in height between the rim and the members placed in position prevents the latter from coming into contact with the support surface of the photo-copying machine. In fact, if this were the case, simultaneous contact of the rim and members on the window of the photo-copying machine would create a risk of movement of these members with respect to the reference sheet, by rotation or translation. This risk would naturally be further increased if the height of the members were greater than that of the rim, since any friction at the time of positioning the support on the photo-copying machine would be exerted on these members.

When this first photo-copy has been obtained, the support is turned-over. It is then possible to modify any data, to chose another hypothesis, to give a different value to one of the variables, to introduce a new factor, in order to study the general evolution of the enterprise examined, over a period of time, with respect to the means, structures, men or according to other criteria for assessment.

On each occasion, a new photo-copy makes it possible to obtain an instantaneous presentation of part of the dynamic process. The succession of these photo-copies is in the form of a film or several films from the same source or different sources. It is thus clearly apparent to what extent the method proposed and the apparatus for carrying it out, described by way of example, have a pedagogic value. The imagination is stimulated by the flexibility of use of the apparatus, whose reference sheets may correspond to the study of the most varied subjects, whether they involve professionals, students or children and whether they relate to the examination of technical, financial or commercial problems for example or to teaching in the most varied fields, or even to games for the purpose of amusement.

Naturally, as the shape of the support and reference sheets may vary, so the number, shape and colour of the members may be multiplied in order to fulfil particular requirements. If desired the rim can define a plurality of windows, and the thin metal plate co-operate with each window.

What is claimed is:

1. A method of dynamic representation of information which comprises providing a frame having a back comprising a sheet of magnetic metal, a rim fixed to said back and having an opening defining a window, a reference sheet overlying said sheet of magnetic metal and visible through said window, said reference sheet having indicia thereon, placing on said reference sheet in selected position thereon a plurality of movable members of selected size, shape and color, said movable members having permanent magnetic properties whereby said members when placed in selected position on said reference sheet are attracted by said underlying sheet of magnetic metal and thereby held on said reference sheet in the position in which they are placed, turning said frame with said reference sheet and said movable members thereon face down on the window of a photocopying machine and operating said machine to make a photocopy of said frame with said reference sheet and said movable members thereon, said rim projecting forwardly from said back beyond said movable members on said reference sheet whereby said rim rests on the window of the photocopying machine and holds said movable members out of engagement with said window to avoid displacement of said movable members on said reference sheet.

2. Apparatus for dynamic representation of information comprising:
   a frame having a back comprising a sheet of magnetic metal,
   a rim fixed to said back and having an opening defining a window,
   a reference sheet overlying said sheet of magnetic metal and visible through said windown, said reference sheet having indicia thereon, and
   a plurality of movable members of selected size, shape and color, said movable members having permanent magnetic properties whereby said members when placed in selected position on said reference sheet are attracted by said underlying sheet of magnetic metal and thereby held on said reference sheet in the position in which they are placed when said frame is placed face down on the window of a photocopying machine,
   said rim projecting forwardly from said back beyond said movable members on said reference sheet, whereby said rim rests on the window of the photocopying machine and holds said movable members out of engagement with said window to avoid displacement of said movable members on said reference sheet.

3. Apparatus according to claim 2, in which said reference sheet is secured to said sheet of magnetic metal by adhesion.

4. Apparatus according to claim 2, in which said reference sheet is secured by being gripped between said sheet of magnetic metal and said rim.

5. Apparatus according to claim 2, in which the thickness of said movable members is at least one third the height of said rim.

6. Apparatus according to claim 2, in which said frame is square and said window is circular.

7. Apparatus according to claim 2, in which said movable members are at least two visually distinguishable types.

8. Apparatus according to claim 2, in which said back comprises a base and a thin sheet of magnetic metal supported on an inner face of said base.

* * * * *